United States Patent
Mulcahy et al.

(10) Patent No.: US 8,217,901 B2
(45) Date of Patent: Jul. 10, 2012

(54) METHOD, SYSTEM, AND COMPUTER PERIPHERAL FOR DOCKING A HANDHELD COMPUTER

(76) Inventors: Michael R. Mulcahy, Silverthorne, CO (US); Marc A. Mulcahy, Superior, CO (US); Matthew R. Mulcahy, Superior, CO (US)

( * ) Notice: Subject to any disclaimer, the term of this patent is extended or adjusted under 35 U.S.C. 154(b) by 0 days.

(21) Appl. No.: 12/816,222

(22) Filed: Jun. 15, 2010

(65) Prior Publication Data

US 2010/0253631 A1   Oct. 7, 2010

Related U.S. Application Data

(63) Continuation of application No. 11/386,591, filed on Mar. 22, 2006.

(51) Int. Cl.
   *G06F 3/02* (2006.01)
(52) U.S. Cl. ........................ 345/168; 340/407.2
(58) Field of Classification Search .......... 345/156–173; 340/407.1
   See application file for complete search history.

(56) References Cited

U.S. PATENT DOCUMENTS

| | | | |
|---|---|---|---|
| 5,793,957 A | | 8/1998 | Kikinis et al. |
| 6,108,200 A * | | 8/2000 | Fullerton ............... 361/679.12 |
| 6,690,353 B2 * | | 2/2004 | Chang ............................ 345/156 |
| 6,803,904 B2 * | | 10/2004 | Furuki et al. .................... 345/168 |
| 6,894,626 B2 * | | 5/2005 | Olodort et al. .................. 341/22 |
| 6,972,699 B2 * | | 12/2005 | Olodort et al. .................. 341/22 |
| 7,052,296 B2 * | | 5/2006 | Yang et al. ..................... 439/165 |
| 7,102,614 B2 * | | 9/2006 | Sandbach et al. ............. 345/156 |
| 7,142,194 B1 * | | 11/2006 | Northway ...................... 345/168 |
| 7,454,000 B1 * | | 11/2008 | Henderson ............... 379/142.04 |
| 2002/0091877 A1 * | | 7/2002 | Karidis ............................. 710/1 |
| 2002/0152020 A1 | | 10/2002 | Seibel |

OTHER PUBLICATIONS

"Tools that Empower Our Customers to Compete Effectively in a Sighted World"; www.humanware.com; The Humanware Group; 2005; 2 pp.
"BrailleNote mPower BT"; www.humanware.com/Product/Notetakers/BrailleNoteBT.asp; The Humanware Group; 2005; 2 pp.
"PocketViewer"; www.humanware.com/Products/Video_Magnifiers/PocketViewer.asp; The Humanware Group; 2005; 2pp.
"Digital Book Players"; www.humanware.ca/web/en/p_DP_VR_Overview.asp; Technologies Humanware Canada Inc.; 2005; 2 pp.
"Low Vision Solutions"; www.freedomscientific.com; Freedom Scientific; at least as early as Mar. 9, 2006; 1 p.
"PAC Mate Headquarters"; www.freedomscientific.com/fs_products/PAC_Mate_HQ.asp; Freedom Scientific; at least as early as Mar. 9, 2006; 6 pp.
"Welcome to GW Micro"; www.gwmicro.com; GW Micro, Inc.; at least as early as Mar. 9, 2006; 2 pp.
"GW Micro—Braille Sense"; www.gwmicro.com/Braille_Sense/; GW Micro, Inc.; at least as early as Mar. 9, 2006; 2 pp.

(Continued)

*Primary Examiner* — Amare Mengistu
*Assistant Examiner* — Vinh Lam
(74) *Attorney, Agent, or Firm* — Holland & Hart LLP

(57) ABSTRACT

In one embodiment, a computer peripheral, is provided with 1) a human input interface; 2) a first computer interface; 3) a data link to provide data connectivity between the human input interface and first computer interface; and 4) a docking port to substantially encase a handheld computer engaged with the first computer interface.

18 Claims, 3 Drawing Sheets

OTHER PUBLICATIONS

"GW Micro—Small Talk Ultra"; www.gwmicro.com/Small-Talk_Ultra/; GW Micro, Inc.; at least as early as Mar. 9, 2006; 2 pp.

"Braillex Product Line", www.papenmeier.de/reha/products/prode.htm; F.H. Papenmeier GmbH & Co KG; 2004; 2 pp.

"Braille IN"; www.papenmeier.de/reha/products/brline.htm; F.H. Papenmeier GmbH & Co KG; 2000; 3 pp.

"VarioPro"; www.baum.de/e/products/variopro/php; BAUM; at least as early as Mar. 9, 2006; 1 p.

"Pronto! The Brandnew Organizer with Braille—and Speechoutput"; www.baum.de/e/products/pronto/php; BAUM; ate least as early as Mar. 9, 2006; 1 p.

"Welcome to Optelec—Optelec"; www.optelec.com; Optelec USA, Inc.; 2005; 2 pp.

"Braille & Speech Products—Optelec"; www.optelec.com/braille-speech/products-solutions; Optelec USA, Inc.; 2005; 2 pp.

"EasyLink"; www.optelec.com/braille-speech/products-solutions/accessible-pda/easylink; Optelec USA, Inc.; 2005; 2 pp.

"Mobile Speak"; www.optelec.com/braille-speech/products-solutions/accessable-cell-phone/mobile-speak; Optelec USA, Inc.; 2005; 3 pp.

"Papenmeier"; www.papenmeier.de/indexe.htm; F.H. Papenmeier GmbH & Co KG; 2000-2005; 1 p.

"Welcome to the Papenmeier Reha Division!" www.papenmeier.de/reha/rehae.htm; F.H. Papenmeier GmbH & Co KG; 2000-2005; 1 p.

\* cited by examiner

METHOD, SYSTEM, AND COMPUTER PERIPHERAL FOR DOCKING A HANDHELD COMPUTER

This is a continuation of pending prior U.S. patent application Ser. No. 11/368,591, filed Mar. 22, 2006 by Michael R. Mulcahy et al. for METHOD, SYSTEM, AND COMPUTER PERIPHERAL FOR DOCKING A HANDHELD COMPUTER. The above-identified patent application is hereby incorporated herein by reference.

BACKGROUND

Handheld computers are common electronic devices primarily functioning to provide a user with mobile computing services. Early handheld computers were limited to basic calendaring and phonebook applications. Now handheld computers are capable of nearly the same tasks as desktop or laptop computers, although memory capacity and processing speed may be limited.

Handheld computers are often used in conjunction with a docking station to synchronize data files with a host computer and recharge the batteries of the handheld computer. These docking stations facilitate the connection of the handheld and host computer. A cradle or wired plug provides the electrical and structural elements of the docking station to dock a handheld computer. Once docked, data connectivity is established between the host and handheld computer. Optionally, an electrical connection is established to recharge the handheld computer's batteries. Other handheld computers utilize infrared or radio, particularly cellular telephone signals, to perform data exchanges with a host computer.

SUMMARY OF THE INVENTION

In one embodiment, a computer peripheral comprises: 1) a human input interface; 2) a first computer interface; 3) a data link to provide data connectivity between the human input interface and the first computer interface; and 4) a docking port to substantially encase a handheld computer engaged with the first computer interface.

In another embodiment, a method for communicating with a handheld computer comprises: 1) docking a handheld computer with a computer peripheral, the docking A) communicatively connecting the handheld computer with the computer peripheral and B) substantially encasing the handheld computer within the computer peripheral; and 2) forwarding input signals from a human input interface of the computer peripheral to the handheld computer.

In another embodiment, a computer system comprises: 1) a handheld computer; and 2) a computer peripheral comprising, A) a human input interface, B) a computer interface to communicate with the handheld computer, C) a docking port having a form factor to substantially encase the handheld computer within the docking port while the handheld computer is engaged with the computer interface, and D) a data link, communicatively connecting the human input interface to the computer interface.

Other embodiments are also disclosed.

BRIEF DESCRIPTION OF THE DRAWINGS

Illustrative embodiments of the invention are illustrated in the drawings, in which.

DETAILED DESCRIPTION

Figure 1:
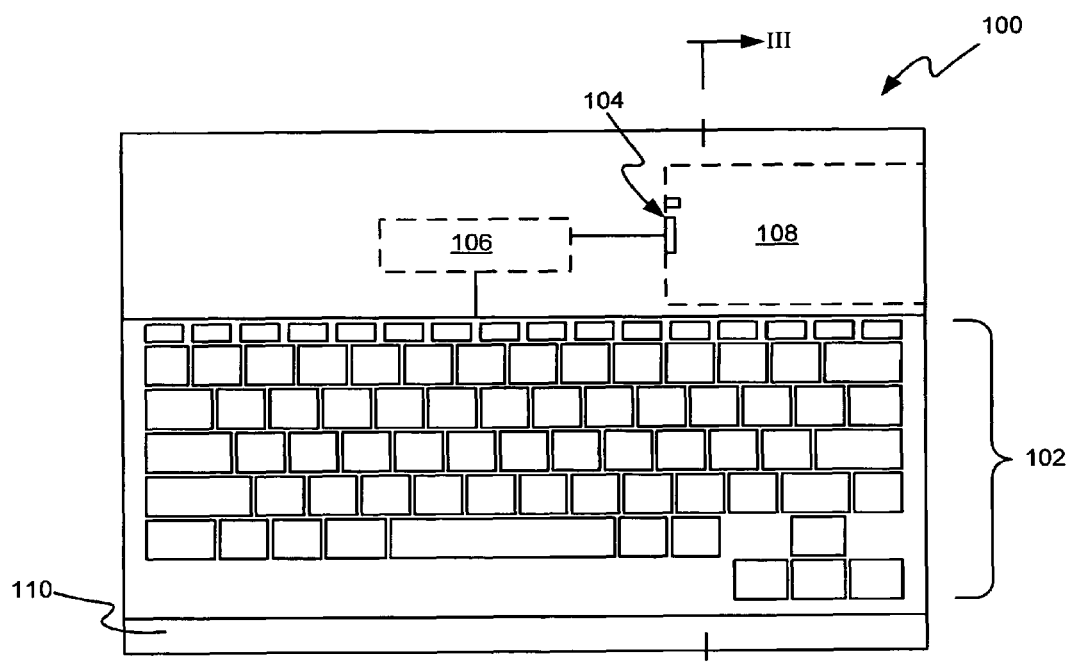
FIG. 1 illustrates a plan view of an exemplary computer peripheral.

As a preliminary manner, it is noted that, in the following description, like reference numbers appearing in different drawing figures refer to like elements/features. Often, therefore, like elements/features that appear in different drawing figures will not be described in detail with respect to each of the drawing figures.

Computer peripherals provide a function to an attached computer. The function may be an alternate or auxiliary function of the computer (e.g., additional data storage, input/output devices), connectivity to other computers or computer systems (e.g., local area network, Internet, peer-to-peer direct connection), or other function. Computer peripherals provide functionality to the computer that may not be desired full-time. For example, a user may connect a laptop computer to computer peripherals, such as a cathode ray tube (CRT) and full sized keyboard, to improve usability. The user may then disconnect such computer peripherals to improve portability.

In recent years, the handheld computer has become more powerful and capable of executing most software applications found on personal computers, although the handheld versions of many software applications may have dissimilar functionality due to the specifications of the handheld computer (e.g., reduced memory, reduced storage space, different input and output capabilities) when compared to a full-functioning personal computer.

Computers, such as handheld computers, are often used in conjunction with a docking station (e.g., cradles and/or cables) to connect the handheld computer to a host computer or peer computer. Connections to the host computer provide a means to synchronize data files, recharge batteries of the handheld computer, and communicate with other computers via the host computer's network connection. Peer-to-peer connections are generally limited to data transfer.

Handheld computers and computer peripherals provide users with the ability to perform a variety of computing tasks. A computer peripheral which is connectable to a handheld computer that is encased within the computer peripheral, provides options not available in the prior art. A handheld computer can be utilized as a stand-alone device and, if a user so desires, placed in a computer peripheral to encase the handheld computer. The user then interacts with the handheld computer via the computer peripheral.

Encasing a handheld computer within the computer peripheral is particularly well suited to those handheld computers not requiring the user's direct interaction with the handheld computer itself. For example, handheld computers for the visually impaired may not have a display screen and, therefore, not have their usability impaired while the handheld is encased within the computer peripheral. As another example, the human interface of a handheld computer is made redundant by the human interface of the computer peripheral, while the handheld computer is encased within the computer peripheral.

FIG. 1 illustrates a plan view of an exemplary computer peripheral 100. A handheld computer is placed in dock 108 to engage first computer interface 104. While the handheld computer is engaged with first computer interface 104 it is substantially encased within computer peripheral 100. A substantially encased handheld computer is at least 50% within the computer peripheral and preferably at least 75% within the computer peripheral. In another embodiment, the handheld computer, while engaged with first computer interface 104, is entirely encased within computer peripheral 100. As a further embodiment, computer peripheral 100 employs a user operable catch to retain the handheld computer within dock 108 until a user releases the catch.

Data link 106 provides data connectivity between first computer interface 104 and human input interface 102. In one embodiment, human input interface 102 is a keyboard (e.g., QWERTY, non-English, or other similar keys). In another embodiment, human input interface 102 is a Braille keyboard. In yet another embodiment, human input interface 102 is an audio transducer (e.g., for speech input). In still another embodiment, human input interface 102 is a tactile input (e.g., touchpad). In simple forms, data link 106 may be a wiring harness, cable or printed circuit board. In more complex forms, data link 106 may comprise passive or active data translators or even a processor.

Wristrest 110 provides a surface to support a user's hand and/or wrist while the user is engaged with human input interface 102, such as when human input interface 102 is a keyboard or other tactile input device.

Dock 108 accepts a handheld computer to engage the handheld computer with first computer interface 104. Dock 108 has a form factor to accept the handheld computer. In a further embodiment, dock 108 has a form factor that restricts the handheld computer from entering dock 108, except when the handheld computer is correctly oriented to engage first computer interface 104.

Figure 2:
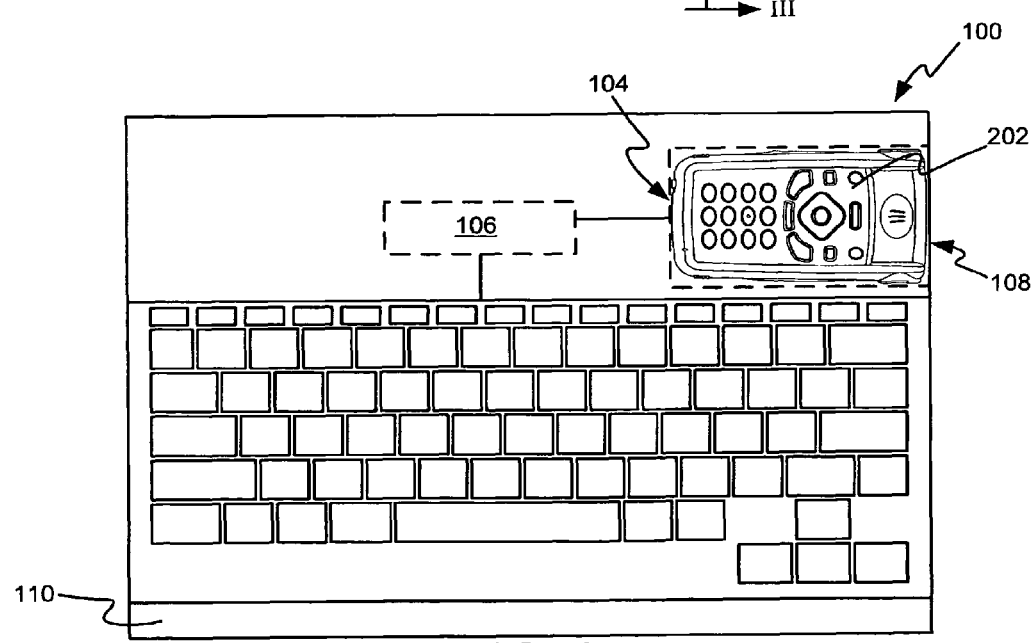
FIG. 2 illustrates the computer peripheral shown in FIG. 1 with a docked handheld computer.

FIG. 2 illustrates the computer peripheral 100 shown in FIG. 1 with a docked handheld computer 202. Handheld computer 202 may be variously embodied and may be an electronic device such as a personal data assistant/personal digital assistant (PDAs), a pen-based handheld computer, a handheld general purpose computer, or a cellular telephone and other devices incorporating PDA or general computer functionality. Docked handheld computer 202 is in communication with data link 106 via first computer interface 104. In another embodiment, first computer interface 104 deactivates a human interface of docked handheld computer 202. In one further embodiment, an electrical circuit is created by both handheld computer 202 and first computer interface 104 to disable the human interface of handheld computer 202. In a second further embodiment, first computer interface 104 provides handheld computer 202 with instructions to disable the human interface of handheld computer 202.

Figure 3:
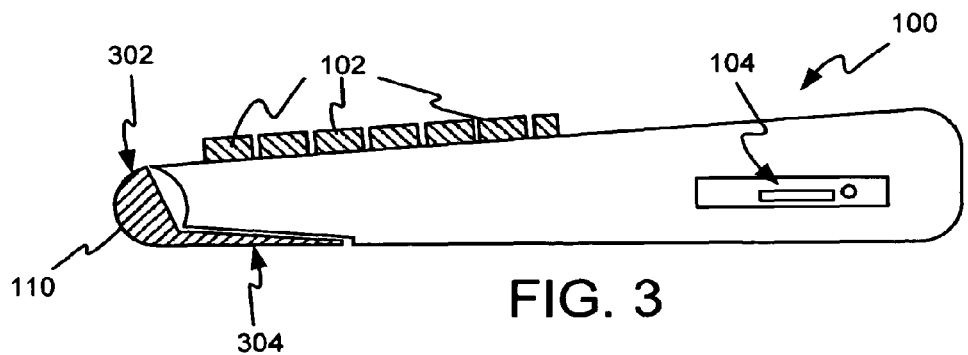
FIG. 3 and FIG. 4 illustrate side elevations of the computer peripheral shown in FIG. 1, wherein the computer peripheral's wristrest is shown in different positions.
Figure 4:
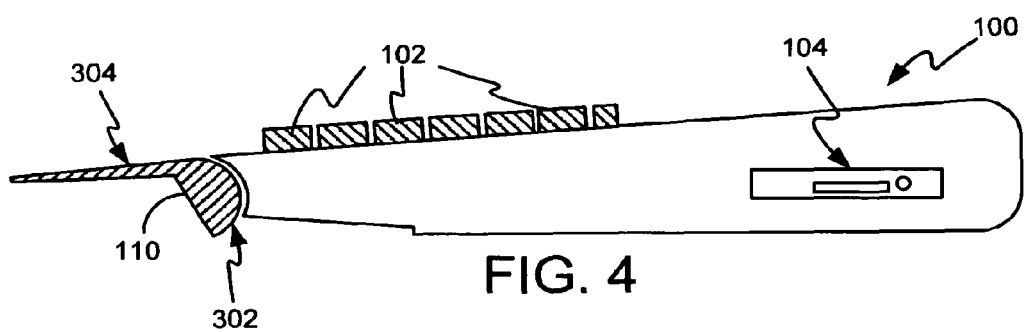

FIG. 3 and FIG. 4 illustrate side elevations of the computer peripheral 100 shown in FIG. 1, wherein the wristrest 110 of the computer peripheral 100 is shown in different positions. FIGS. 3 and 4 are cross-sectional views of computer peripheral 100 wherein most interior components of computer peripheral 100 are not illustrated for clarity. FIG. 3 illustrates the cross section III-III of FIG. 1, showing wristrest 110 in a first position. Wristrest 110, while in the first position, exposes first contact surface 302 for use to support a hand or wrist of a user engaged with human input interface 102. Wristrest 110 can be rotated to select the first position (see FIG. 3) or the second position (see FIG. 4). FIG. 4 illustrates cross section III-III showing computer peripheral 100 with wristrest 110 in a second position. While wristrest 110 is in the second position, second contact surface 304 is exposed for use to support a hand or wrist of a user engaged with human input interface 102. First contact surface 302 and second contact surface 304 are dissimilar (e.g., surface area, dimension, texture, material, et cetera).

Figure 5:
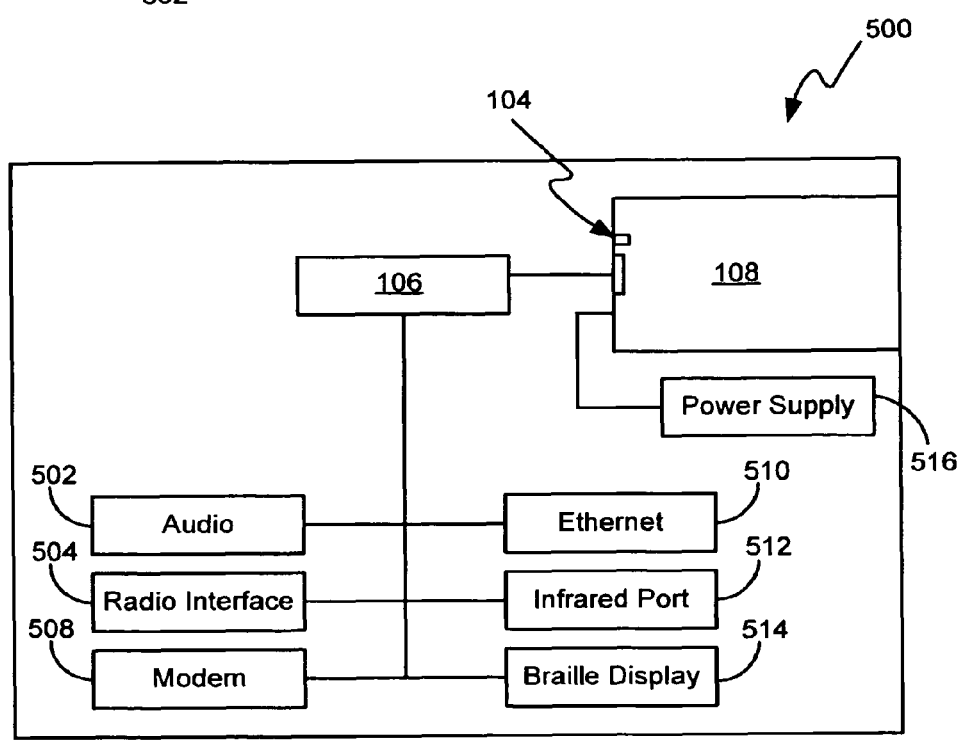
FIG. 5 illustrates a block diagram of an exemplary port structure for the computer peripheral shown in FIG. 1.

FIG. 5 illustrates a block diagram of an exemplary port structure for the computer peripheral 100 shown in FIG. 1. Computer peripheral 100 includes functions 502, 504, 508, 510, 512, 514, 516 that may be implemented individually or in combination with other ones of functions 502, 504, 508, 510, 512, 514, 516.

In one embodiment, computer peripheral 100 includes a human output interface. In one further embodiment, the human output is audio output 502. In a second further embodiment, the human output is Braille display 514.

In a second embodiment, computer peripheral 100 includes a second computer interface to communicate with a computer other than a handheld computer engaged with the first computer interface. In one further embodiment, the second computer interface is radio interface 504. Radio interface 504 may be implemented using various analog and digital protocols over a suitable bandwidth of the radio spectrum. Examples of radio interface 504 include BlueTooth™ and analog and cellular telephone protocols. In other further embodiments modem 508, Ethernet 510, and infrared port 512 are the second computer interface. Other computer interfaces, as are known in the art, may be incorporated to facilitate the communication with other computers.

The second computer interface, such as interfaces 504, 508, 510, 512, may provide actual connectivity to the other computer via computer peripheral 100 itself or in conjunction with a handheld computer docked to first computer interface 104. For example, a handheld computer may include a cellular telephone. A user operating a handheld computer via first computer interface 104 may utilize radio interface 504 in conjunction with functionality within the handheld computer (e.g., network authorization "smart card", user identification, transmit/receive circuitry, antenna). In another example, Ethernet 510 may provide connection to another computer or network (e.g., LAN, WAN, Internet) via a cable physically attached to computer peripheral 100.

In a third embodiment, power supply 516 provides power to a handheld computer attached to first computer interface 104. Power supply 516 may provide operating power and/or recharge power for the batteries of a handheld computer attached to first computer interface 104. Power supply 516 is variously embodied to include an AC adapter, rechargeable and single-use batteries, fuel cells, solar cells, generators, or other electric power supply.

Figure 6:
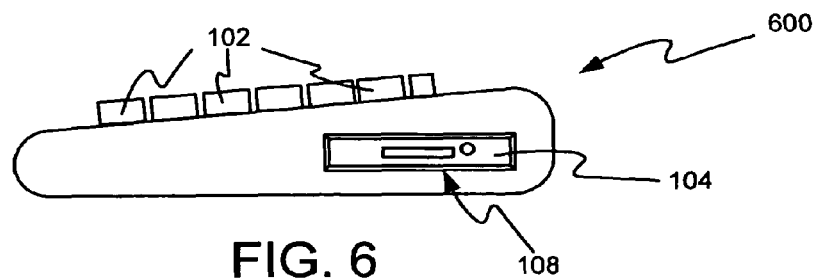
FIG. 6 illustrates a side elevation of an alternate embodiment of the computer peripheral shown in FIG. 1.

FIG. 6 illustrates a side elevation of an alternate embodiment of the computer peripheral 100 shown in FIG. 1. Computer peripheral 100 is variously embodied and includes a form factor selected as a matter of design choice. Computer peripheral 600 may provide a more compact form factor over computer peripheral 100 but does not include an extendable wristrest.

Figure 7:
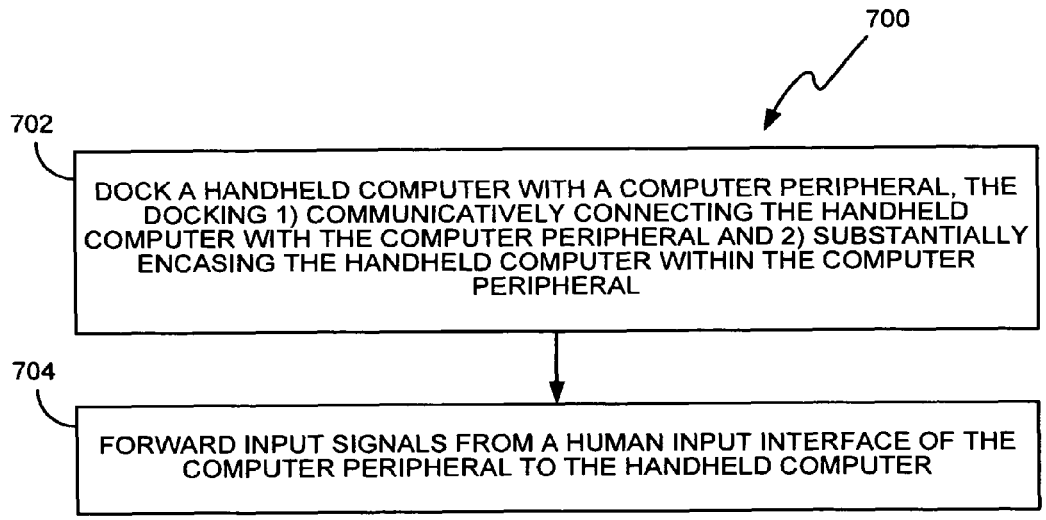
FIG. 7 illustrates an exemplary method for communicating with a handheld computer via a computer peripheral.

FIG. 7 illustrates an exemplary method 700 for communicating with a handheld computer via a computer peripheral 100. Method 700 includes steps 702 and 704 for 1) docking a handheld computer with a computer peripheral, the docking A) communicatively connecting the handheld computer with the computer peripheral and B) substantially encasing the handheld computer within the computer peripheral; and 2) forwarding input signals from a human input interface of the computer peripheral to the handheld computer.

In another embodiment, method 700 includes a step for forwarding output signals from the handheld computer to the human input interface of the computer peripheral.

In another embodiment, method 700 includes a step for rotating a wristrest to select one of a plurality of dissimilar surfaces to support a human hand or wrist engaged with the human input interface.

In yet another embodiment, method 700 includes a step for, under control of the peripheral device, A) forwarding input signals from a computer other than the handheld computer to the handheld computer; and B) forwarding output signals from the handheld computer to the said other computer. In one further embodiment, the peripheral device controls the handheld computers interaction with the other computer, such as when the handheld computer communicates using internal cellular telephone circuitry. In a second further embodiment, the peripheral device controls the handheld computer's interaction with the other computer via a connection within the computer peripheral (e.g., an Ethernet connection).

What is claimed is:

1. Apparatus for interacting with a handheld host computer, the apparatus comprising:
   a computer peripheral having a form factor, the computer peripheral comprising:
      a docking port defined in the form factor of the computer peripheral, the docking port configured to substantially encase a removable handheld computer;
      a keyboard disposed in the form factor, the keyboard configured to receive input from a human;
      a handheld computer interface within the form factor, the handheld computer interface configured to engage the handheld computer when the handheld computer is in the docking port; and
      a data link within the form factor, the data link coupled between the keyboard and the handheld computer interface, the data link and the handheld computer interface configured to i) communicatively connect the keyboard of the computer peripheral to the handheld computer, as a peripheral of the handheld computer, and ii) forward the input from the keyboard directly to the handheld computer interface, the data link enabling interaction between the keyboard and the handheld computer when the handheld computer is encased within the docking port.

2. The apparatus of claim 1, wherein the keyboard is a Braille keyboard.

3. The apparatus of claim 1, wherein the keyboard is a QWERTY keyboard.

4. The apparatus of claim 1, wherein the data link comprises a wiring harness.

5. The apparatus of claim 1, wherein the data link comprises a cable.

6. The apparatus of claim 1, wherein the data link comprises a printed circuit board.

7. The apparatus of claim 1, wherein the data link comprises passive data translators.

8. The apparatus of claim 1, wherein the data link comprises active data translators.

9. The apparatus of claim 1, wherein the data link comprises a processor.

10. The apparatus of claim 1, wherein the computer peripheral further comprises a human output interface.

11. The apparatus of claim 10, wherein the human output interface comprises an audio output interface.

12. The apparatus of claim 10, wherein the human output interface comprises a Braille display.

13. The apparatus of claim 1, wherein the docking port entirely encases a handheld computer engaged with the handheld host computer interface.

14. The apparatus of claim 1, wherein the handheld host computer interface further comprises deactivation instrumentation to deactivate a human interface of handheld computer while engaged with the handheld host computer interface.

15. The apparatus of claim 1, wherein the docking port further comprises an interior form factor to restrict insertion of the handheld computer into the docking port except when the handheld computer is properly oriented to engage the handheld host computer interface.

16. The apparatus of claim 1, further comprising a power supply operable to recharge a power supply of a handheld computer engaged with the handheld host computer interface.

17. The apparatus of claim 1, wherein the docking port substantially encases at least 75% of the handheld host computer engaged with the handheld host computer interface.

18. The apparatus of claim 1, wherein the docking port substantially encases the handheld host computer engaged with the handheld host computer interface and provides no viewable display screen of the handheld host computer.

* * * * *